United States Patent

Adachi et al.

[11] Patent Number: 6,138,351
[45] Date of Patent: *Oct. 31, 2000

[54] METHOD OF MAKING A VALVE SEAT

[75] Inventors: Shuhei Adachi; Junichi Inami, both of Iwata, Japan

[73] Assignee: Yamaha Hatsudoki Kabushiki Kaisha, Iwata, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/614,503

[22] Filed: Mar. 13, 1996

[30] Foreign Application Priority Data

Mar. 13, 1995 [JP] Japan ................................... 7-079326

[51] Int. Cl.⁷ ............................................. B21K 1/24
[52] U.S. Cl. ........................ 29/888.44; 29/890.122; 251/368; 123/188.8
[58] Field of Search ................. 251/368; 29/469.5, 29/521, 888.4, 888.42, 888.44, 888.46, 890.122, 890.124; 123/188.8

[56] References Cited

U.S. PATENT DOCUMENTS

| | | |
|---|---|---|
| 3,428,035 | 2/1969 | Stefan et al. . |
| 3,611,535 | 10/1971 | Nobach . |
| 3,694,173 | 9/1972 | Farmer et al. . |
| 3,790,352 | 2/1974 | Miimi et al. . |
| 3,802,852 | 4/1974 | Niimi et al. . |
| 3,806,325 | 4/1974 | Niimi et al. . |
| 3,925,065 | 12/1975 | Osawa et al. . |
| 3,950,165 | 4/1976 | Oda et al. . |
| 3,973,952 | 8/1976 | Bieber et al. . |
| 3,982,905 | 9/1976 | Osawa et al. . |
| 4,094,707 | 6/1978 | Schrewe et al. . |
| 4,122,596 | 10/1978 | Fields . |
| 4,346,684 | 8/1982 | Vossieck . |
| 4,363,662 | 12/1982 | Takahashi et al. . |
| 4,424,953 | 1/1984 | Takagi et al. ............................. 251/368 |
| 4,502,433 | 3/1985 | Becker, Jr. et al. . |
| 4,505,988 | 3/1985 | Urano et al. . |
| 4,671,491 | 6/1987 | Kuroishi et al. . |
| 4,793,970 | 12/1988 | Miimi et al. . |
| 5,183,025 | 2/1993 | Jorstad et al. . |
| 5,188,799 | 2/1993 | Mori et al. . |
| 5,586,530 | 12/1996 | Adachi et al. . |
| 5,649,358 | 7/1997 | Adachi et al. . |
| 5,653,377 | 8/1997 | Reatherford et al. . |
| 5,742,020 | 4/1998 | Adachi et al. . |
| 5,803,037 | 9/1998 | Kawammura et al. . |

FOREIGN PATENT DOCUMENTS

| | | |
|---|---|---|
| 0064367 | 11/1982 | European Pat. Off. . |
| 0092683 | 11/1983 | European Pat. Off. . |
| 0228282 | 7/1987 | European Pat. Off. . |
| 9427767 | 12/1994 | WIPO . |

*Primary Examiner*—David P. Bryant
*Attorney, Agent, or Firm*—Knobbe, Martens, Olson & Bear LLP

[57] ABSTRACT

A valve seat and cylinder head arrangement wherein the valve seat insert is formed from a material having an elongation at rupture of greater than 1 percent so as to facilitate tapered pressing to form a bonded valve seat.

6 Claims, 9 Drawing Sheets

State of Compound Layer in Cross Section

Relationship between Bond Strength and Compound Layer Thickness

Change in Heat Treatment Process Pattern for Improving Elongation

Relationship between Valve Seat Crack Occurrence Rate and Material Elongation

Bond Strength Improvement Effect by Improved Shape

METHOD OF MAKING A VALVE SEAT

BACKGROUND OF THE INVENTION

This invention relates to a valve seat arrangement for a reciprocating machine and more particularly to an improved valve seat for an internal combustion engine.

In internal combustion engines it frequently is the practice to employ aluminum or aluminum alloys as the material for a number of the major engine castings such as the cylinder heads. When the cylinder heads are formed from aluminum or aluminum alloys, however, certain components of the cylinder head are formed from a dissimilar material so as to improve performance. For example, the valve seats of the cylinder head are normally formed from a harder, less heat conductive material such as iron or ferrous iron alloys. By utilizing such harder materials, the valve seat life can be extended. However, the attachment of the dissimilar valve seat insert into the cylinder head presents a number of problems.

Conventionally, it has been the practice to form the cylinder head passages with recesses adjacent the seating area into which the insert rings which form the valve seat are press fit. The use of press fitting has a number of disadvantages. First, it requires relatively large valve seat inserts in order to withstand the pressing pressures. In addition, the press fit mutt be such that the insert ring will not fall out when the engine is running. As a result there are quite high stresses exerted both on the cylinder head and on the insert ring The stresses can result in loads which may eventually cause cracks in the cylinder head.

These types of construction also limit the maximum size and spacing of the valve seats in order to ensure adequate cylinder head material between adjacent valve seats to reduce the likelihood of cracking. In addition, the large seats compromise the configuration of the intake passages, Particularly at the critical valve seating area. Finally, these constructions result in somewhat poor heat transfer from the valve to the cylinder head due to the poor thermal conductivity of the valve seat material.

In addition, the interface between the insert ring and the cylinder head frequently leaves voids or air gaps which further reduce the heat transfer and thus cause the valves to run at a higher temperature. This higher temperature operation of the valves requires the valves to be made heavier and stronger and thus reduce the performance of the engine and increase its size and costs.

It has been proposed, therefore, to utilize a technology wherein the insert ring is actually welded into the cylinder head. Such welding generally ensures against the likelihood of stresses which may cause cracking. Nevertheless, the welding technique itself requires rather large inserts and thus a number of the disadvantages with pressed in inserts also are found with welded inserts. Furthermore, the heat transfer problems are also prevalent and in some instances can become worsened.

With a welding technique, there is actually formed a metallurgical alloy between the material of the insert ring and the cylinder head. Because of the fusion process, air pockets or voids may occur and heat transfer is reduced. In addition, the alloy at the interface between the insert ring and the cylinder head also has poor thermal conductivity and thus a number of the problems present with pressed in inserts are also present with welded inserts.

Another technique has been suggested and employed wherein a laser cladding technique is employed. Again, however, this requires actual melting of the materials and as a result many of the problems with other more conventional techniques are also present.

It has been proposed, therefore, to employ a technique wherein the insert ring is metallurgically bonded but not alloyed to the cylinder head material. This is accomplished by pressing the insert into place and passing an electrical current through the insert which is sufficient to cause the cylinder head material to plastically deform upon insertion of the insert ring. The plastically deformed phase of the cylinder head material forms a metallurgical bond at the interface with the insert ring without any significant resulting alloying of the cylinder head material to that of the insert ring. Such an arrangement is disclosed in our co-pending application entitled, "Valve Seat Bonded Cylinder Head aid Method for Producing Same," Application No., 08/483,246, filed Jun. 7, 1995 and assigned to the assignee hereof. In addition, certain of these techniques are also described in co-pending application entitled "VALVE SEAT," Application Ser. No. 08/278,026, filed Jul. 20, 1994, in the names of Shuhei Adachi & Junichi Inami and also assigned to the Assignee hereof.

These techniques have a number of advantages over the conventional structures. First, they permit the use of much smaller insert rings since the pressing pressure is reduced and thus the shape of the intake passage, particularly the shape of the cylinder head passages, particularly in the critical area of the valve seats are not compromised. In addition, the bond strength is considerably higher than more conventional methods. Furthermore, this technique, because of the improved way in which the adhesion is formed, permits the use of much smaller insert rings and thus permits the valve seat openings to be positioned closer to each other without the likelihood of causing defects in the cylinder head which may manifest themselves during the engine running and life.

In the aforedescribed co-pending applications, two different types of pressing techniques are employed for pressing and bonding the insert ring into position. In accordance with one of these techniques, called the "end pressing" method, the pressure is applied generally to the insert ring along the end face of the ring and about a pressing surface that extends generally perpendicularly to the flow axis of the insert ring. With this type of arrangement, the outer periphery of the insert ring is formed with a first section that extends from the pressing surface generally axially and which is inclined at a relatively shallow acute angle to the flow axis direction. This surface terminates in a generally radially extending surface which preferably is incline at a small acute angle to the surface to which the pressing force is applied.

With this type of pressing method, the insert ring generally experiences primarily only a compressive force and hence it is not stressed in a manner where the ring is likely to be damaged. However, the bonding strength along the periphery of the insert ring is not completely uniform. The bonding strength is found to be substantially higher along the bottom surface then along the incline side surface.

The other type of pressing technique which is employed is a "tapered pressing" technique wherein the pressing tool has a tapered surface which engages a tapered surface of the insert ring which tapered surface forms a part of the final flow passage. This technique permits the use of an exterior surface for the insert ring wherein the lower surface portion can be inclined at a greater angle to the perpendicular plane passing through the flow axis and a mole uniform bond results. However, the loads placed on the insert are tensile rather than compressive and hence with conventional materials, the stressing might cause problems with the insert ring.

It is, therefore, a principal object of this invention to provide and improve insert ring material that has properties that will ensure against damage from over stressing with either type of pressing method.

It is a further object of this invention to provide and improve insert ring material for a bonded valve seat wherein the insert ring is formed with a material that has a substantially greater elongation at rupture than conventional materials and thus, produces the aforenoted results.

It is yet a further object of this invention to provide an improved method for forming engine valve seats.

SUMMARY OF THE INVENTION

This invention is adapted to be embodied in an insert ring for forming a valve seat in a reciprocating machine by a bonded metallurgically pressing method. The insert ring is formed from a material that has an elongation at rupture at 1% or more.

DETAILED DESCRIPTION OF THE PREFERRED EMBODIMENT OF THE INVENTION

It should be noted that the actual mechanical way in which the bond is formed with the valve seat is as described in the aforenoted co-pending applications, the disclosures of which are incorporated herein by reference. Even though these disclosures are incorporated herein by reference and the invention in this application deals primarily with the material from which the insert ring is made and the shape and pressing methods, a general description of the bonding process will also be included. However, were further information is required, reference may be had to the aforenoted co-pending applications.

Figure 1:
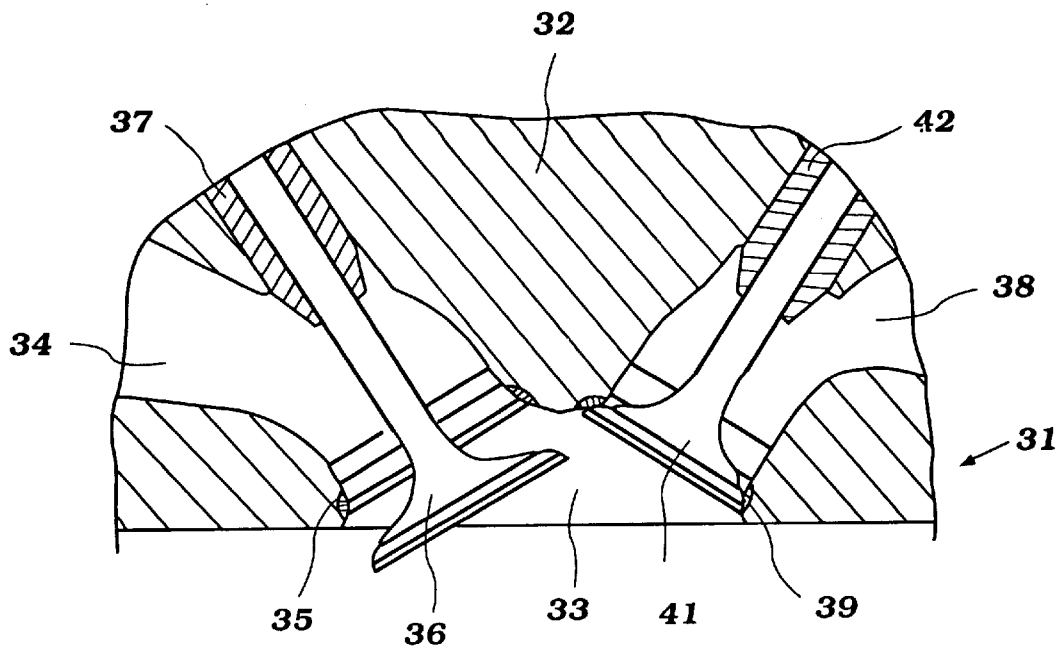
FIG. 1 is a partial cross-sectionial view taken through a cylinder head having valve seats formed and constructed in accordance with the invention.

Referring first to FIG. 1, a cylinder head for an internal combustion engine utilizing the invention is identified generally by the reference numeral 31. The cylinder head includes a base cylinder head casting 32 which is formed from an aluminum or aluminum alloy. Such materials are highly desirable for use in engine components and particularly cylinder heads because of their light weight and high thermal conductivity.

The cylinder head 32 is formed with combustion chamber recesses 33 which cooperate with the associated cylinder bore and piston (both of which are not shown) of the associated engine to form its combustion chambers. An intake charge is delivered to these combustion chamber through one or more intake passages 34 that are formed in the cylinder head material 32 and which terminate at valve seat 35 within the cylinder head recess 33. Poppet type intake valves 36 are supported within the cylinder head 32 by valve guides 37 for controlling the opening and closing of the valve seats 35 in a well known manner. The intake valves 36 may be operated by any known type of valve actuating mechanism.

One or more exhaust passages 38 extend from the cylinder head recesses 33 and specifically from valve seats 39 formed therein for the discharge of the combustion products from the combustion recesses 33 in a manner also well known in this art. Exhaust valves 41 are slideably supported in the cylinder head 32 by valve guides 42. These exhaust valves 41, like the intake valves 36 are operated by any known type of mechanism.

Figure 2:
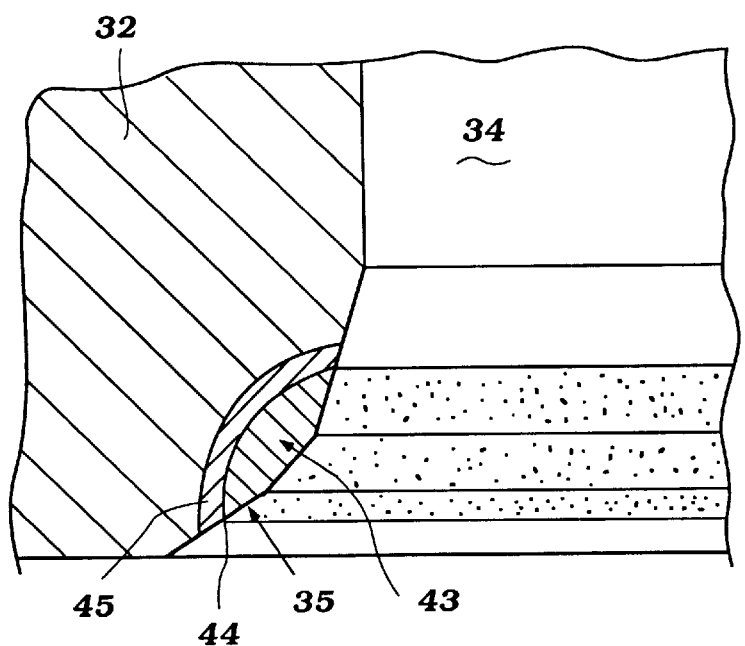
FIG. 2 is an enlarged cross-sectional view taken along the same plane as FIG. 1 in the area of the valve seat showing the bonding of the insert into the cylinder head material.
Figure 3:
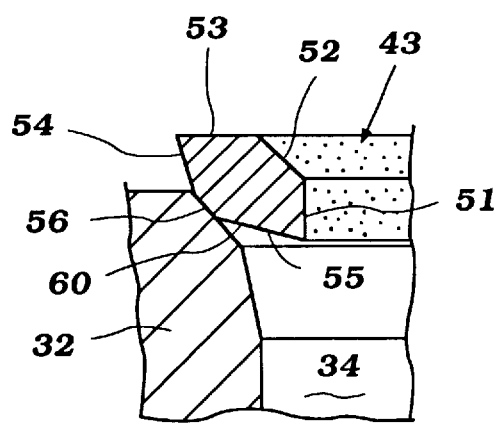
FIGS. 3–8 are step-by-step cross-sectional views showing the steps in pressing in and bonding a valve seat insert utilizing the end pressing technique with the initial step being shown in FIG. 3 and the final, finished machine valve seat being shown in FIG. 8.
Figure 4:
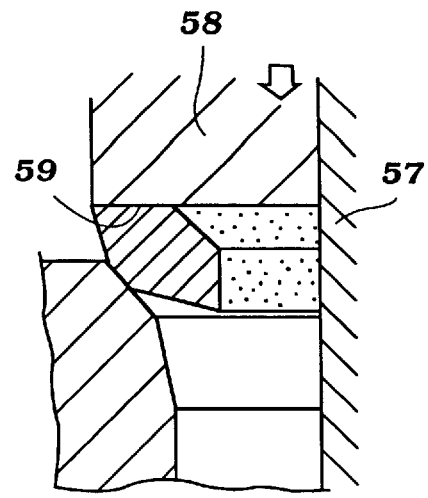
Figure 5:
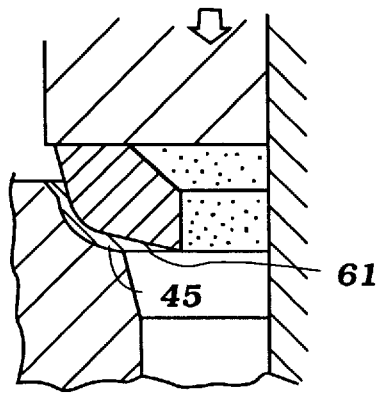
Figure 6:
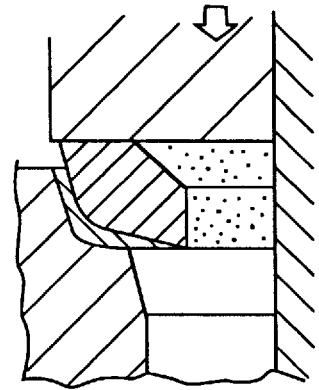

The invention, as should be readily apparent from the foregoing description, deals in the way in which the valve teats 35 and 39 are formed. FIG. 2 is an enlarged cross-sectional view of one of the intake valve seats 35 and this description may be considered to be typical for that which may be utilized with the exhaust valves 41 to form the exhaust valve seats 39.

Basically, the valve seat 35 is formed by an insert ring, indicated by the reference numeral 43 and which has a metallurgical construction as will be described. This insert ring 43 is bonded to the cylinder head material 32 by a relatively thin metallurgical bonding layer 44 that is formed in a manner which will be described. By relatively thin, it should be noted that this bonding layer is no thicker than about ten micrometers (10 mu). Adjacent this bonding layer 44, there is formed a portion of the material of the cylinder head 32 which has been plastically deformed and that layer is indicated by the reference numeral 45. This layer has a thickness which preferably is no greater than 200 mu. It should be noted that the alloy of the cylinder head 32 is of the same chemical composition and same physical structure, except for being slightly work hardened in the area 45 as in the remainder of the cylinder head material 32.

Referring now to FIGS. 3–8, a first pressing methodology by which the valve seat 35 may be formed is illustrated and will be described. In this embodiment, the insert ring 43, is formed from a material which will be as described and which is basically a Sintered ferrous alloy having a coating material filled within its intercices and also on its external surface as desired. The insert ring 45 has a configuration which is comprised of a generally cylindrical flow passage forming portion 51 that is aligned with the flow axis of the cylinder head intake passage 34 in the area of the valve seat 35. Adjacent to the seating surface, this interior surface is formed with a conical section 52 that lies at an angle that is at approximately 45 degrees to the cylindrical surface 51.

The end pressing surface, which extends perpendicularly to the axis of the cylindrical section 51, is indicated at 53 and this is the surface to which the pressing force is applied, as will be described.

The outer surface of the ring 53 has a first conical portion 54 that is inclined at a relatively shallow acute angle to the axis of the cylindrical surface 51. The lower end face 55 is inclined at an acute angle to the pressing surface 53 and is joined to the surface 54 by a rounded portion 56. The end surface of the cylinder head 32 at the inlet to the intake passage 34 is tapered as at 60.

For the pressing action, a guide number having a cylindrical configuration and indicated by the reference numeral 57 it inserted into the cylinder head intake passage 34. A pressing mandril 58 is supported on this guide 57 and has a lower pressing surface 59 that is engaged with and forced by an associated press against the pressing surface 53 of the insert ring 43.

Figure 15:
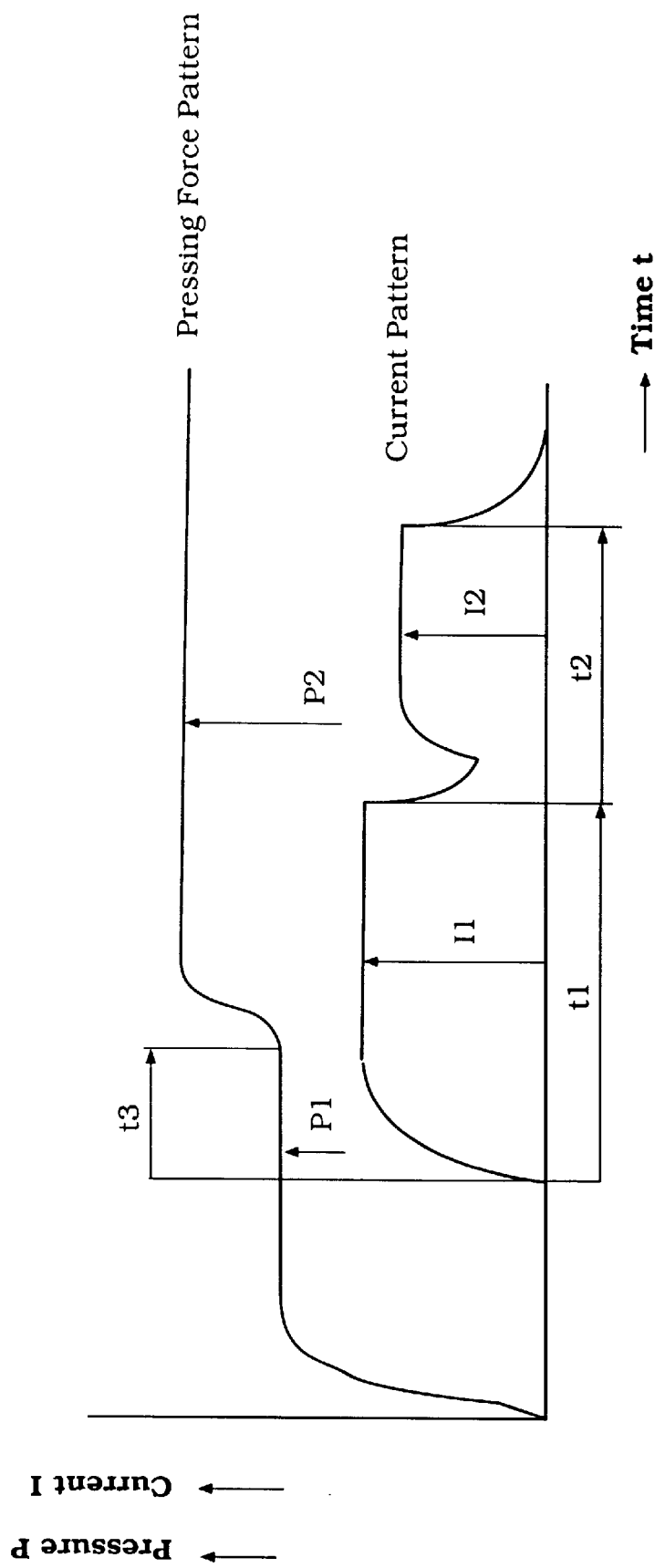
FIG. 15 is a graphical view showing pressing force and electric current flow in accordance with a preferred method of practicing the invention to achieve a bonded valve seat having the properties aforenoted.

At some time after the pressing force is applied and preferably after some initial time delay and until a predetermined pressure has been exerted, as will be described later by reference to FIG. 15, an electrical current is passed through the pressing mandril 58 and the insert ring 43 and cylinder head 32. At the area where the highest pressure exists, the cylinder head material will then begin to plastically deform where the plastically deformed stage 45 is formed as shown beginning at FIG. 5.

It should be noted that the amount of current flow that is generated is sufficient to cause plastic deformation and localized melting without causing any melting of the insert ring 43 and to ensure against the formation of any alloy between the materials of the insert ring 43 and the cylinder head material 32. This is desirable to improve bonding strength.

The coating material, which will be hereinafter describe, is effective so as to cause any aluminum oxides which may be present on the cylinder head recess surface to be expelled at the periphery of the resulting gap as shown by the bulged out portions 61. Hence, any imperfections in the cylinder head material caused at the surfaces will be expelled and finally machined away so as to provide a very strong bond and one in which has high strength. In addition, no voids will result that would impede heat transfer and the work hardening caused by the plastic deformation of the cylinder head portion 45 will add to the strength and resist loadings caused by the different thermal expansion between the insert ring and the cylinder head material. This metallurgical structure will later be described by reference to FIG. 16.

Figure 7:
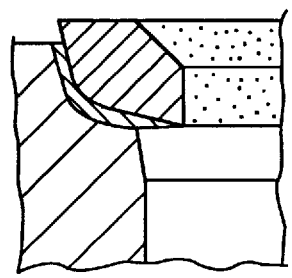
Figure 8:
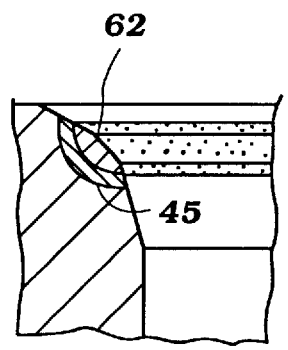

After the insert ring 43 is firmly bonded in place as shown in FIG. 7, the finish machining of the cylinder head and insert ring is accomplished so as to form the final valve seat configuration as shown in FIG. 8. It should be noted from this figure that the remaining insert ring material 43 is quite small and really only extends over a seating area 62 that is engaged by the respective poppet valve. As a result, there is no sacrifice in the configuration of the intake passage 34 dictated by the use of large insert rings as with prior art constructions.

As has been noted, this pressing method described in FIG. 3–8 generally reduces or totally eliminates the tensile loading on the insert ring 43 during the installation process since the choice of appropriate configurations as described in aforenoted co-pending application, Application Ser. No. 08/278,026 is employed. However, as has also been noted, the bonding strength is not as good since the bond at the insert ring surface 55 is stronger than that a the insert ring surface 54. Therefore, a so-called tapered type pressing method as shown in FIGS. 9–14 is preferred.

In this embodiment, the insert ring is still indicated generally by the reference numeral 43 but its configuration is different as will be described and therefore different numbers are employed for identifying the portions of its configuration.

The insert ring 43 in accordance with this embodiment is formed with a cylindrical inner surface 81 that is relatively short in axial length and which merges into a tapered conical surface 82 which is disposed at a slightly or significantly greater area than the surface 52 of the previous embodiment. More importantly, however, the surface 82 extends for a substantially greater length.

The surface 82, which is actually the pressing surface, as will be described, ends in an end surface 83. And a first, conical outer surface section 84 extends at an acute angle to the axis of the cylindrical section 81 and merges at a rounded section 85 into an inclined lower end surface 86 which is formed at a greater angle than that of the previously described embodiment. However, this angle is still an acute angle to a plane perpendicular to the axis of the cylindrical section 81.

Figure 9:
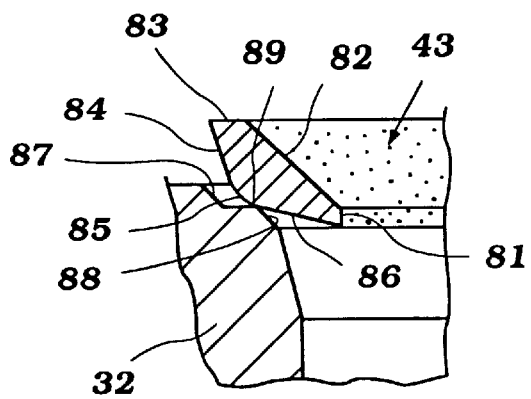
FIGS. 9–14 are step-by-step cross-sectional views, in part similar to FIGS. 3–8 showing the tapered pressing method in accordance with the invention with FIG. 9 showing the initial step and FIG. 14 showing the final machine valve seat.
Figure 10:
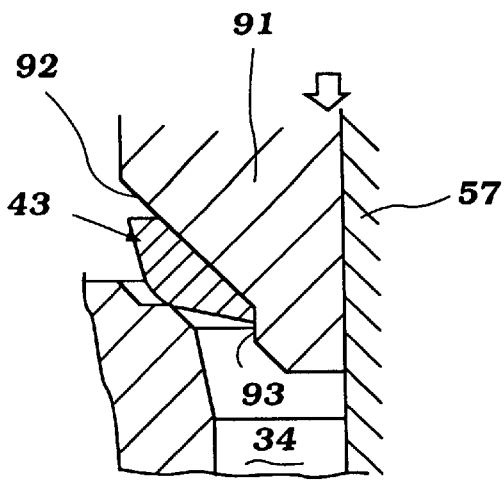
Figure 11:
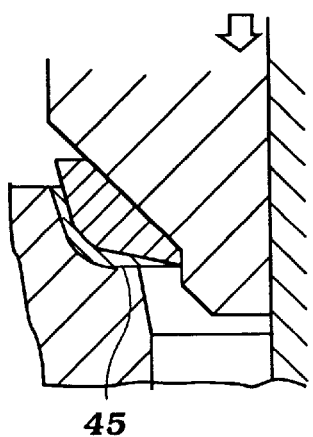
Figure 12:
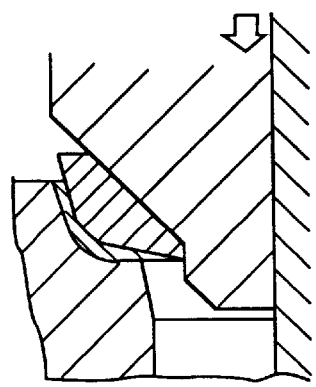
Figure 13:
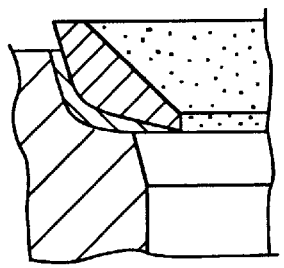
Figure 14:
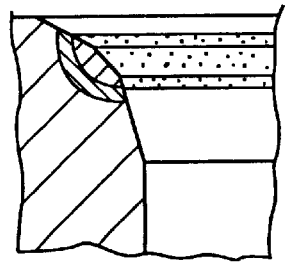

The cylinder head material 32 is formed with a recess that is comprised of a first section 87 that is connected to a second section 88 that are joined by a horizontal surface that forms a projecting ledge 89 that contacts the rounded portion 85 of the insert ring 43 upon initial installation (FIGS. 9 and 10). This tends to form a localized area that will begin the plastic deformation phase.

Like the previously described embodiment, the pressing apparatus includes a guide post 57 that extends into the cylinder head passage opening 34 and which supports a pressing member 91. The pressing member 91 has an inclined pressing surface 92 that is complementary in configuration to the insert conical portion 82. A pilot portion 93 of the pressing member is generally complementary to the insert ring opening 81, but actually forms no pressing function.

The insert ring 43 is formed preferably from a material, as will be described, and one which has an alloying and heat treatment so that its elongation at rupture is one percent (1%) or more. This is opposed to the conventional Sintered iron elongation at rupture of zero, point two percent (0.2%). Because of this greater elongation, the pressing forces will not cause any stresses in the insert ring 43 that can cause cracks, either on pressing or subsequently.

Like the previously described embodiments, a pressing force is then applied, and a current is passed so as to cause the plastic deformation layer 45 to be formed. This pressing pattern will now be described by particular reference to FIG. 15.

As may be seen, a pressure is gradually applied through the pressing mandrel or tool 91 along its surface 92. This pressure is gradually built up to the pressure P1 and is held constant for a time until the electrical current begins to flow. The electrical current is built up over a time period t3 to a first relatively high current flow I1. After this occurs, there will be sufficient liquification and plastic deformation of the material, and the pressing force is then built up to a higher pressing force P2.

At some time t1, the current is decreased so as to avoid excess heating and any melting or plastic deformation, at least in this embodiment, of the insert ring 43. Then the current flow is again raised to a lower level I2 from the level I1 and held at this lower level for an additional time period t2 while the pressing force P2 is maintained. Then the current flow is discontinued while the pressing continues up to the stage of FIG. 13. At this time the bond is finally and completely formed.

Figure 16:
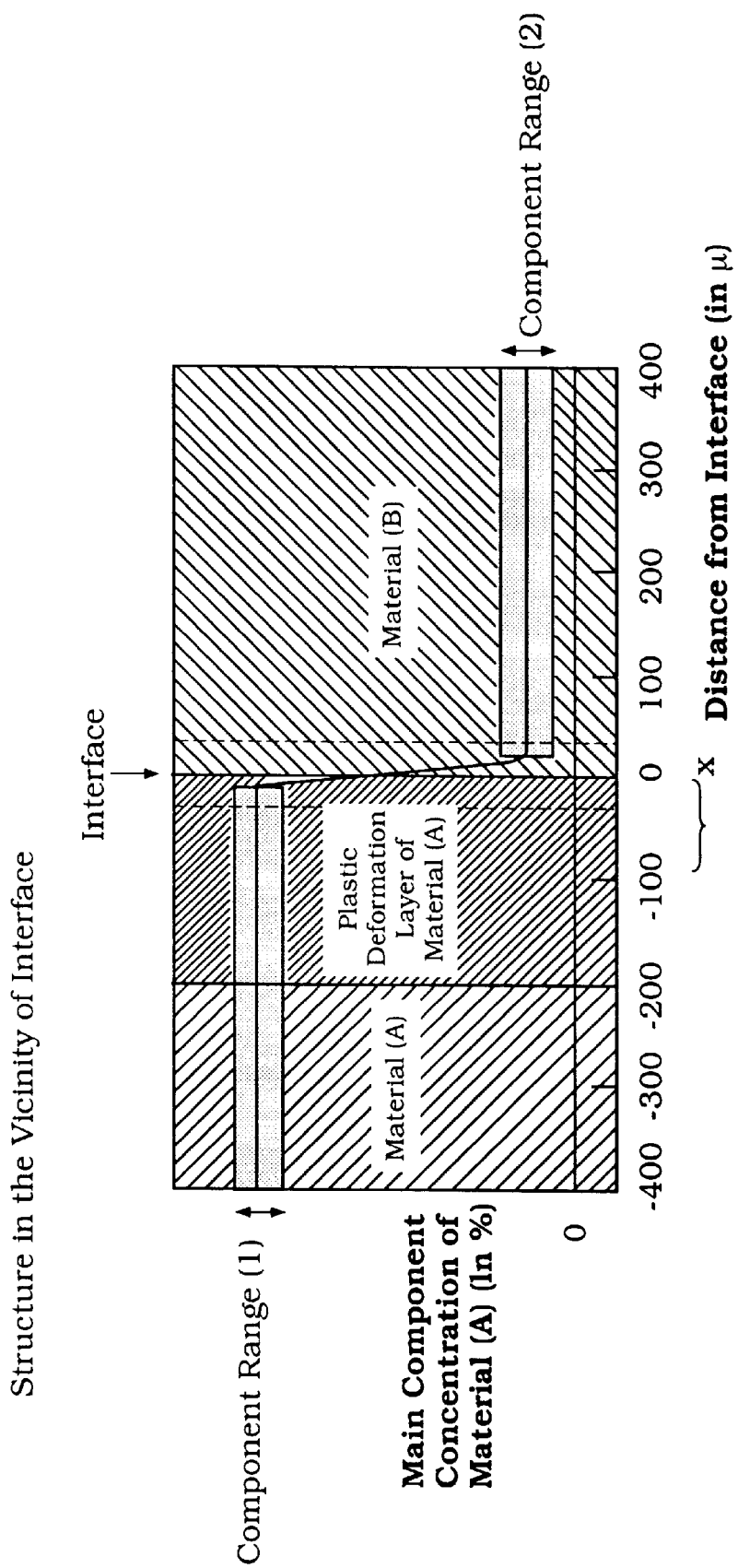
FIG. 16 is an enlarged metallurgical cross-sectional view showing the material in the valve seat with the cylinder head material being shown as A, the insert material being shown as B and the plastically deformed portion of the cylinder head being shown in the finer cross-hatched portion also indicated at A.
Figure 17:
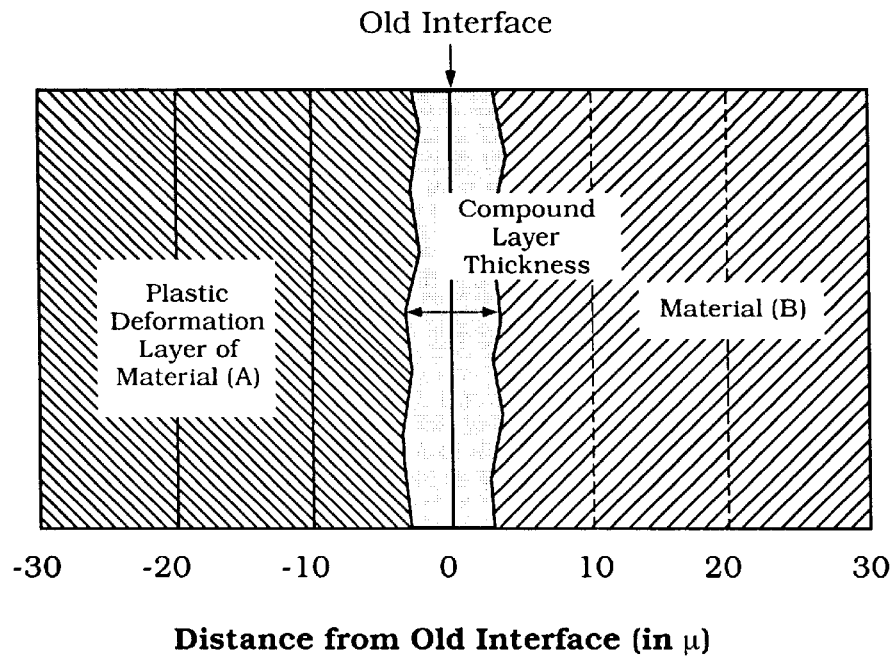
FIG. 17 is a further enlarged metallurgical cross-sectional view of the area immediately adjacent the juncture between the cylinder head material and the insert ring material.

FIGS. 16 and 17 illustrate how this resulting bond appears metallurgically. It should be noted in the plastically deformed layer, which is about $200\mu$ from the actual interface, dendrite crystals and columnar crystals, which are typically in the cast texture, are curved. Thus, the aspect ratio of eutectic silicon particles is great, and dislocation density is high due to the dislocation caused by deformation. Hence, hardness is raised, also, due to the work hardening. However, it should be noted that the chemical constituents of the plastically deformed layer are substantially identical to that in the base material. This is true up to the depth $10\mu$ at the interface where there is a metallurgical bond between the materials. Because of this, even when the engine is running and the valve seat area becomes heated, there will be no subsequent alloying that could cause failures.

Figure 18:
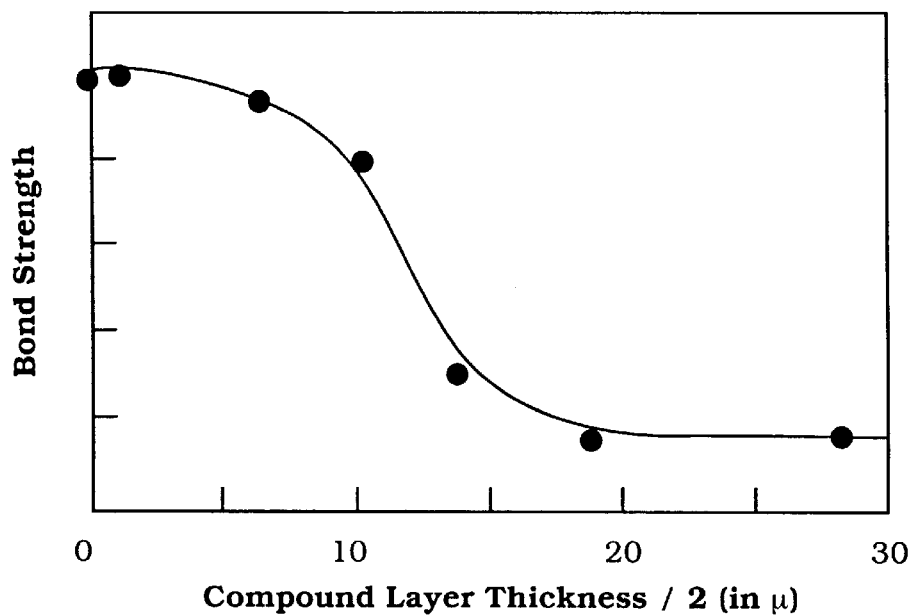
FIG. 18 is a graphical view showing the bond strength in relation to the bonded compound thickness layer.

FIG. 17 shows the resulting cross section at the new interface wherein there is the relatively small compound layer thickness. FIG. 18 is a graphical view showing how the thickness of the compound layer is very important in resulting bond strength. As long as this thickness is less than $10\mu$, the bond strength is quite high. However, if the compound layer is made thicker, then the bond strength deteriorates rapidly.

Figure 19:
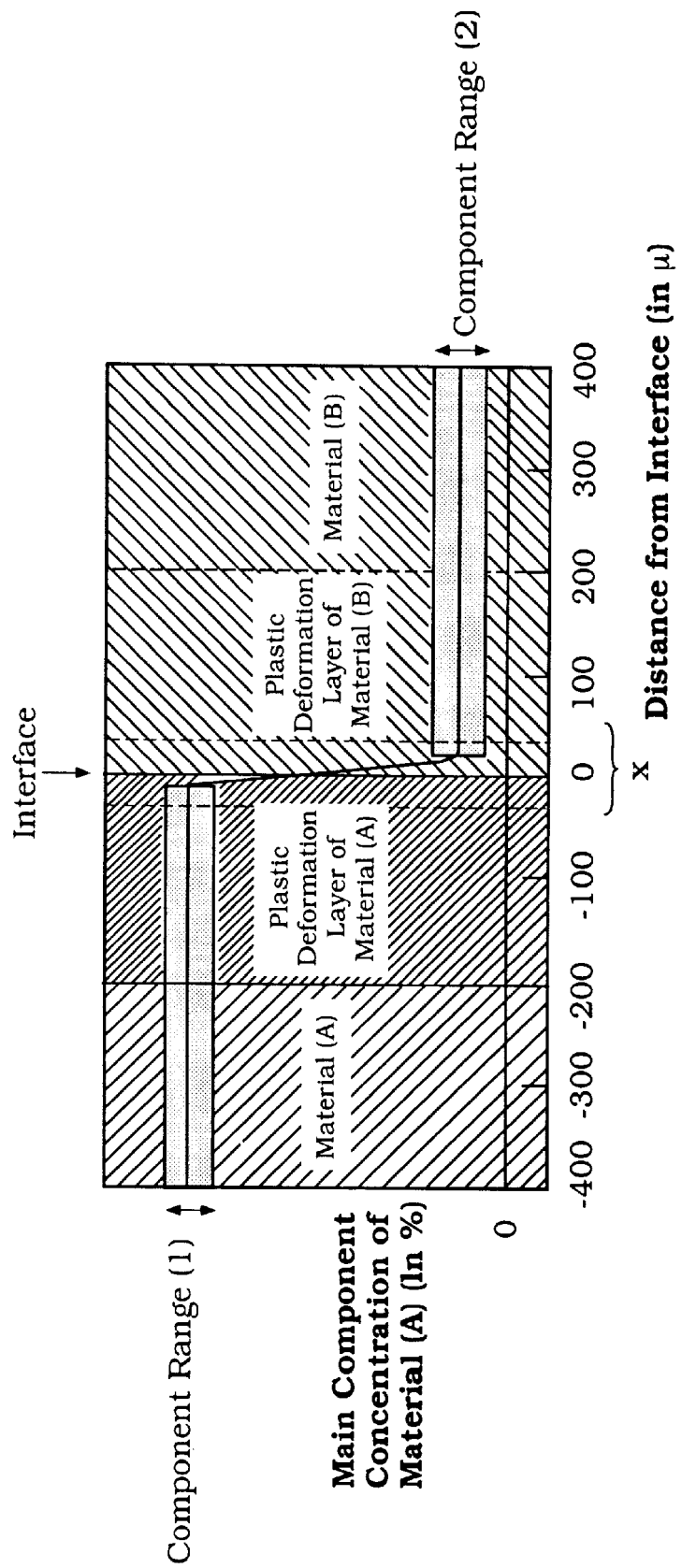
FIG. 19 is a cross-sectional view, in part similar to FIG. 16, and shows the formation of a bond wherein both the cylinder head and insert ring are plastically deformed during the bonding process.
Figure 20:
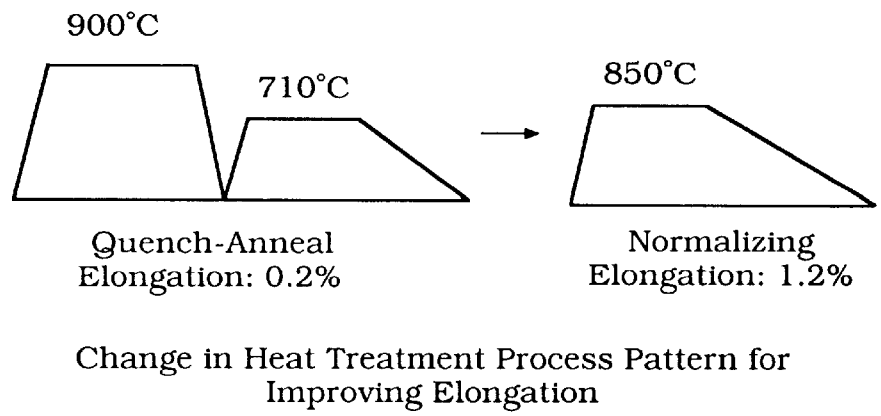
FIG. 20 is a graphical view showing the heat treatment process utilized normally for forming insert rings, on the left, and that utilized in conjunction with the invention, on the right.

In the embodiments as thus far described, the plastic deformation occurs entirely within the material of the cylinder head 32. It is possible, however, to provide an arrangement wherein there is plastic deformation both in the valve seat material and in the cylinder head material, and FIG. 19 shows a desired arrangement of this type. In this arrangement the metallurgical bonding layer is kept at a small thickness, such as $10\mu$, for the reasons aforedescribed. However, there may be plastic deformation of both the valve seat material and the cylinder head material with this arrangement.

As has been noted, the insert ring may be farmed from a Sintered iron or the like. However, the material is chosen so that the percentage elongation at room temperature at rupture is 1 percent or more. Therefore, to the base ferrous material, the following components are added by weight percentage:

1.0–1.6 of carbon (C)
1.3–3.0 of nickel (Ni)
5.5–8.0 of chromium (Cr)
0.3–0.8 of molibdnium (Mo)
5.0–8.0 of cobalt (Co)
11.0–18.0 of copper (CII)
1.5–3.0 of tungsten (W)

This material is then heat treated by a method which differs from the conventional quench and anneal method where the material is heated to 900° C., is then quenched. The quenched material is then annealed at 710° C. so as to result in a final elongation at rupture of about 0.2 percent.

Figure 21:
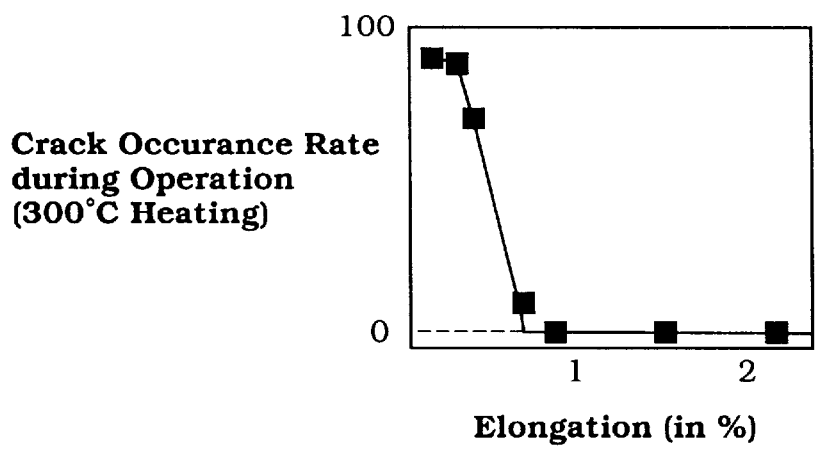
FIG. 21 is a graphical view showing how the material in accordance with the invention offers a significant improvement in crack prevention from the prior art materials.

In accordance with this invention, the material of the insert is normalized by holding it at 850° C. for a time period and then gradually returning its temperature to normal. As a result, an elongation of greater than 1 percent is possible. In the illustrated embodiment, 1.2 percent is achieved. This is also attained by changing the diameter of the hard particles contained in the valve seat material textures from $100\mu$ to $50\mu$. Because of this, and as shown n FIG. 21, the likelihood of cracks occurring during subsequent operation at high temperatures such as 300° is substantially, if not totally, eliminated.

The copper, which also may form a coating, reacts with any surface aluminum oxides to remove them and is not left after the bonding.

Figure 22:
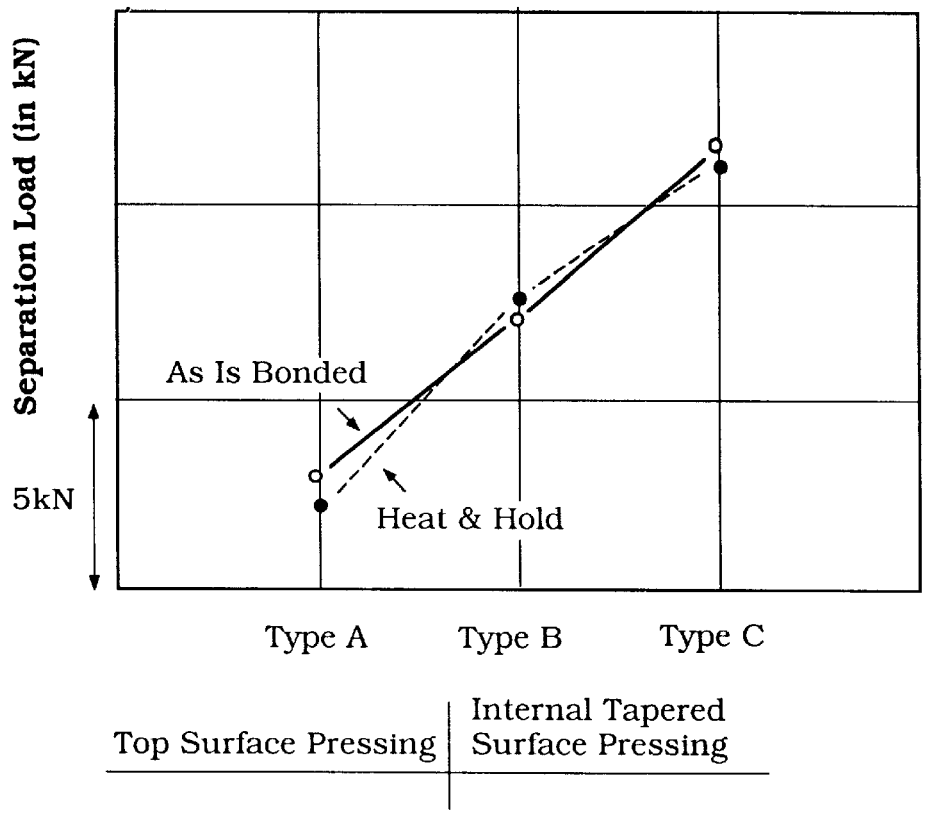
FIG. 22 is a graphical view slowing the improvements in bonding strength by modifying the form of the insert ring and pressing method.
Figure 23:
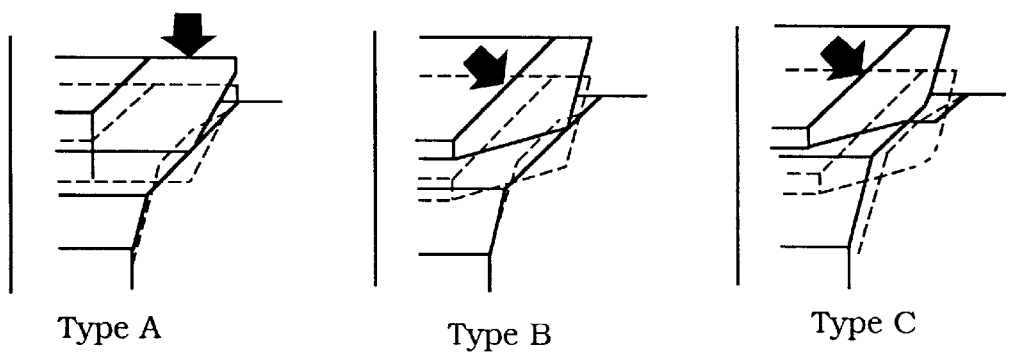
FIG. 23 is a cross-sectional view showing the three types of insert ring configurations and pressing methods depicted in FIG. 22.

FIGS. 22 and 23 show the respective bonding strengths of three different types of pressing methods and insert and cylinder head configurations. It is seen that the construction as utilized in the embodiments shown in FIGS. 9–14 clearly provides the greatest strength.

In FIG. 22 there is depicted both the as-bonded strength and the strength of the bond if the cylinder head is heated 300° C. and held at that temperature for 24 hours to simulate actual engine running conditions of a severe nature. It will be seen that the strength of the bond varies little, after this severe testing.

Thus, from the foregoing description it should be readily apparent that the described insert ring material and pressing methods provide very effective valve seats that will eliminate sacrifices in strength and port configuration over conventional methods. In addition, because of better heat transfer, lighter weight valves can be utilized and larger valve areas can be employed so as to increase the performance of the engine without shortening its life. Of course, the foregoing description is that of the preferred embodiment of the invention, and various changes and modifications may be made without departing from the spirit and scope of the invention, as defined by the appended claims.

What is claimed is:

1. A method of forming a valve seat insert in a cylinder head comprising the steps of: forming a cylinder head casting having a flow passage therein terminating at a port opening, forming an insert ring by a sintering process from an alloyed ferrous material having an elongation at rupture characteristic of substantially less than 1% and subsequently performing a heat treating step on the sintered insert ring to increase its elongation at rupture characteristic to a value equal to 1 percent or greater, placing said sintered and heat treated insert ring into said port opening, and applying heat and pressure on said insert ring to place a tensile force upon said insert ring sufficient to bond said insert ring into said cylinder head casting at said port opening.

2. A method of forming a valve seat insert as defined in claim 1, wherein the insert ring is formed by sintering a ferrous base material alloyed in the following percentages by weight with the following alloying materials:

1.0–1.6 of carbon (C);
1.1–3.0 of nickel (Ni);

5.5–8.0 of chromium (Cr);
0.3–0.8 of molybdenum (Mo);
5.0–8.0 of cobalt (Co);
11.0–18.0 of copper (Cu); and
1.5–3.0 of tungsten (W).

3. A method of forming a valve seat insert as defined in claim 1, wherein the ferrous valve seat insert ring is formed with a relatively short cylindrical section and a relatively long conical section and the tensile force and pressure is applied by exerting a pressing force to the relatively long conical section sufficient to bond the valve seat insert ring into the cylinder head at the port opening.

4. A method of forming valve seat insert as defined in claim 3, wherein the cylinder head casting is formed from a lightweight material selected from the group of aluminum of aluminum alloy.

5. A method of forming a valve seat insert as defined in claim 4, wherein the valve seat insert ring and the cylinder head casting are metallurgically bonded at their interface.

6. A method of forming a valve seat insert as defined in claim 5, wherein the bonded interface is no thicker than 10 $\mu$.

* * * * *